(12) United States Patent (10) Patent No.: US 8,856,507 B2
Machani et al. (45) Date of Patent: Oct. 7, 2014

(54) SECURE IDENTITY AND PERSONAL INFORMATION STORAGE AND TRANSFER

(75) Inventors: Salah E Machani, Thornhill (CA); John M Couse, Toronto (CA); Hussam Mahgoub, Richmond Hill (CA)

(73) Assignee: IMS Health Inc., Danbury, CT (US)

( * ) Notice: Subject to any disclaimer, the term of this patent is extended or adjusted under 35 U.S.C. 154(b) by 1445 days.

(21) Appl. No.: 11/953,696

(22) Filed: Dec. 10, 2007

(65) Prior Publication Data

US 2008/0148040 A1 Jun. 19, 2008

(30) Foreign Application Priority Data

Dec. 12, 2006 (CA) ..................................... 2571666

(51) Int. Cl.
*H04L 29/00* (2006.01)
*G06F 21/62* (2013.01)
*H04L 9/32* (2006.01)

(52) U.S. Cl.
CPC .......... *G06F 21/6245* (2013.01); *H04L 9/3263* (2013.01); *H04L 2209/805* (2013.01); *G06F 2221/2115* (2013.01); *H04L 2209/56* (2013.01); *H04L 2209/88* (2013.01); *H04L 9/3226* (2013.01)
USPC ............ 713/150; 713/151; 713/152; 713/153

(58) Field of Classification Search
USPC ..................................................... 713/150, 193
See application file for complete search history.

(56) References Cited

U.S. PATENT DOCUMENTS

| 7,043,754 | B2 * | 5/2006 | Arnouse ......................... 726/20 |
| 7,117,370 | B2 * | 10/2006 | Khan et al. ..................... 713/186 |
| 7,822,984 | B2 * | 10/2010 | Martin et al. .................. 713/175 |
| 7,984,514 | B1 * | 7/2011 | Meketa ........................... 726/30 |
| 2005/0177729 | A1 * | 8/2005 | Rose .............................. 713/182 |
| 2005/0188424 | A1 * | 8/2005 | Kizyma ......................... 726/26 |
| 2005/0210278 | A1 * | 9/2005 | Conklin et al. ............... 713/194 |
| 2006/0117173 | A1 * | 6/2006 | Deblock et al. ............... 713/150 |

* cited by examiner

*Primary Examiner* — Ghazal Shehni
(74) *Attorney, Agent, or Firm* — Maldjian Law Group LLC; John Maldjian; Alexander D. Walter

(57) ABSTRACT

The invention presented herein consists of systems and methods of secure storage for sensitive and confidential data, such as personal identity data, along with methods of securely accessing that data, and transferring information from that data, as necessary.

20 Claims, 4 Drawing Sheets

SECURE IDENTITY AND PERSONAL INFORMATION STORAGE AND TRANSFER

FIELD OF THE INVENTION

The present invention relates to the field of securing personal and identity information. In particular, it relates to secure methods and systems for accessing, transferring and storing personal and identity information.

BACKGROUND OF THE INVENTION

One of the issues arising from the increased use of electronic communications is the need for the user to keep track of numerous IDs, passwords, codes and other personal and identity information needed to access and make use of different vendors and services.

Related to this issue is the effort required to coordinate between traditional physical personal and identity information (licenses, credit card, ID cards) and digital personal and identity information (IDs, passwords, security codes), particularly in areas where both are required, such as online shopping. There is a need for a fully digital system which securely provides the user with digital versions of all their personal and identity information, eliminating the requirement to carry or access physical copies of that information.

Similarly, personal and identity records, typically kept in secure storage, such as medical records, insurance information, and investment portfolios, tend to be difficult to access and retrieve. There is a need for a system that enables personal and identity records to be digitally stored for easier and quicker retrieval by the user, preferably from a mobile device, whenever necessary.

Ideally, any secure personal and identity information system needs to enable both of the features detailed above.

It is an object of this invention to partially or completely fulfill one or more of the above-mentioned needs.

SUMMARY OF THE INVENTION

The invention consists of a system of two elements: a first element, which allows a user to access personal and identity information (user IDs, credit card numbers, passwords, etc.) and a second element, which stores large files of personal and identity information (health records, insurance documents, financial records, etc.) and allows a user to securely access, display and transfer the files stored therein. By analogy, the contents of the first element resemble those of a wallet (i.e. those which a user would generally have accessible on their person), and the contents of the second element resemble those of a vault (i.e. those which a user would store in a secure location and not have generally accessible on their person).

Other and further advantages and features of the invention will be apparent to those skilled in the art from the following detailed description thereof, taken in conjunction with the accompanying drawings.

BRIEF DESCRIPTION OF THE DRAWINGS

The invention will now be described in more detail, by way of example only, with reference to the accompanying drawings, in which like numbers refer to like elements, wherein.

DETAILED DESCRIPTION OF THE PREFERRED EMBODIMENTS

Figure 1:
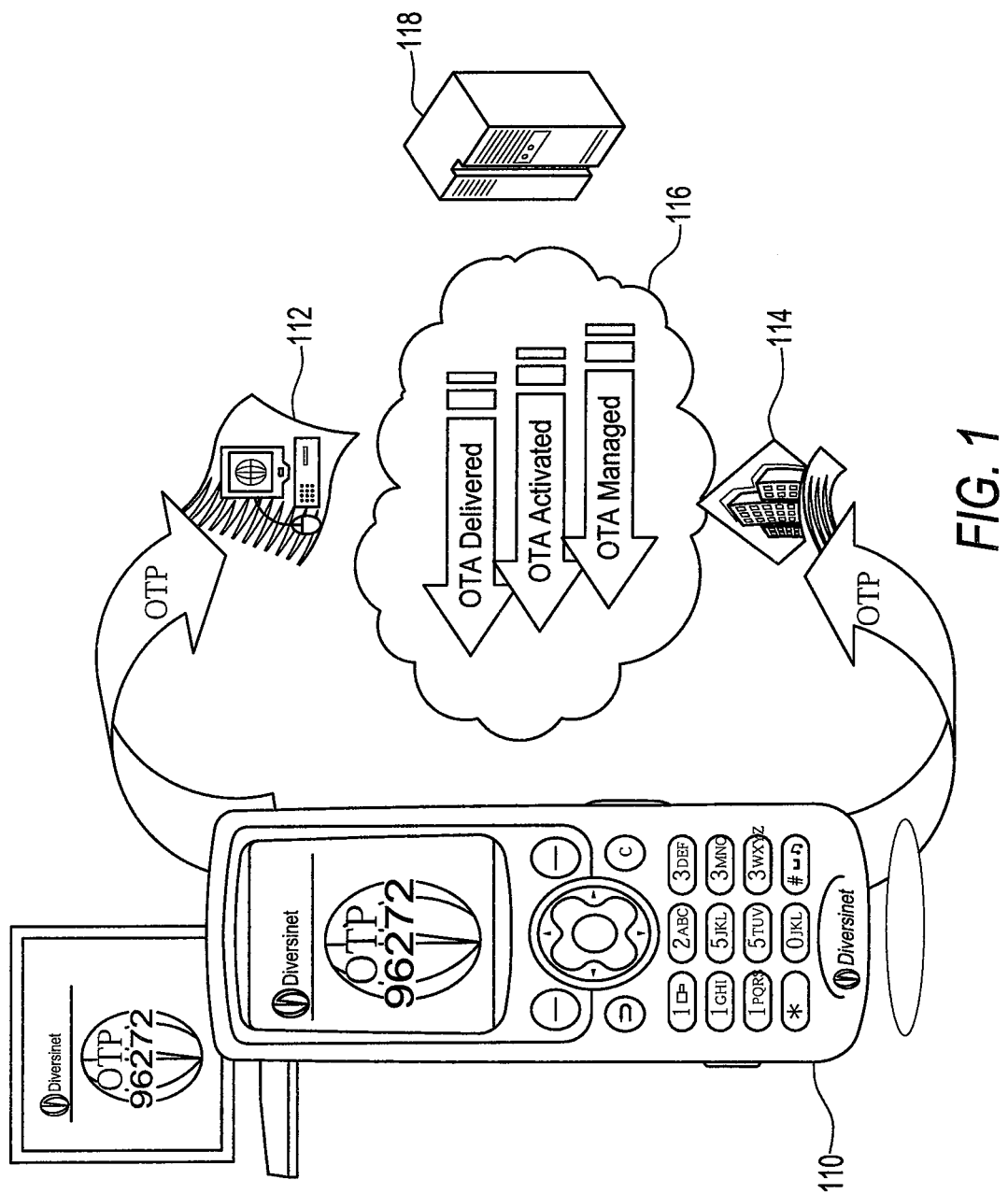
FIG. 1 is a diagram outlining token-based secure access from a mobile phone.

The invention presented herein consists of systems and methods of secure storage for sensitive and confidential data, such as personal and identity data, along with methods of securely accessing that data, and transferring information found in that data, as necessary.

The system preferably consists of two elements: a first element, which allows a user to access personal and identity information (user IDs, credit card numbers, passwords, etc.) and a second element, which stores large files of personal and identity information (health records, insurance documents, financial records, etc.) and allows a user to securely access, display and transfer the files stored therein. By analogy, the contents of the first element resemble those of a wallet (i.e. those which a user would generally have accessible on their person), and the contents of the second element resemble those of a vault (i.e. those which a user would store in a secure location and not have generally accessible on their person).

The first element is designed to function on a user-controlled device, preferably a mobile device, such as a mobile phone or PDA, but also, for example, from a laptop or desktop PC. The second element is meant to be accessed by a user, preferably via a mobile device such as a mobile phone or PDA, and to enable transmission of the information contained therein via secure systems, such as SMS, email, HTTP (HyperText Transfer Protocol) or facsimile, depending on the capabilities of the device and the required format of the information.

Preferably, the security for both the first and second element is a strong authentication system, such as a One-Time Password (OTP) system. An OTP system provides the advantage over traditional PIN- or password-based system in that a new password is generated each time the system is accessed, preventing duplication and reducing the risk of theft. Other strong authentication systems can be used, either individually or in combination, such as Public Key Infrastructure (PKI), digital signatures and biometric (fingerprint or other) systems.

The first and second elements are further designed to work in conjunction, such that accessing information in the first element can automatically trigger information retrieval from the second element. This aspect can be further enhanced by creating linked tasks, such that on activation of the task, information is called up from the first element and retrieved from the second element automatically. For example, a task can be designated for medical admission. When this task is triggered, the user's government health ID information is retrieved from the first element, and the user's medical records are called up from the second element. Similar task combinations can be readily created to deal with any conceivable situation.

Another aspect is to provide for search mechanisms triggered from the mobile device, enabling the user to search for information stored in the second element, within a specific context, and retrieve only that information, rather than a complete record. Again, to consider the medical example, the user could search the second element for "allergies" and retrieve any medical records (or all records, depending on the context used) related to allergies only, and not retrieve other, unrelated medical records, reducing the amount of information transferred.

Preferably, the second element is provided by a third party, not the users themselves, as a service. This provision enables additional backup for the users of their personal copies of the information, while the strong authentication system provides the necessary security measures.

The first element is preferably capable of displaying the information in a multiplicity of formats, depending on the information and the requirements of the users. Formats include plain text, HTML, text/photo combinations, and barcodes. Different personal and identity information may require specific formats. For example, a driver's license requires, at minimum, a text/photo combination to duplicate the physical license, and may further require a barcode display, if such is also found on the physical device.

While the first element is primarily for personal and identity recognition and secure payment purposes, it can be readily expanded to suit various forms of personal and commercial purposes. For example, loyalty or rewards programs can allow the first element to store the user's identity information for the program, and then coupons or vouchers can be provided that are accessed via the first element.

Preferably, access to the first element and the second element is provided via a context-driven menu interface. Thus, by selecting a single keyword ("banking", "auto", "medical"), the user is able to call up all relevant information from both elements. In combination with the task structure discussed above, any transaction can be reduced to one or two steps, greatly facilitating use on a mobile device.

A mobile phone-based embodiment of an OTP system is shown in FIG. 1. The phone 110 accesses a website 112 or corporate intraweb 114 via a generated OTP 116. Authentication is validated by the token provider 118 and access is granted.

Figure 2:
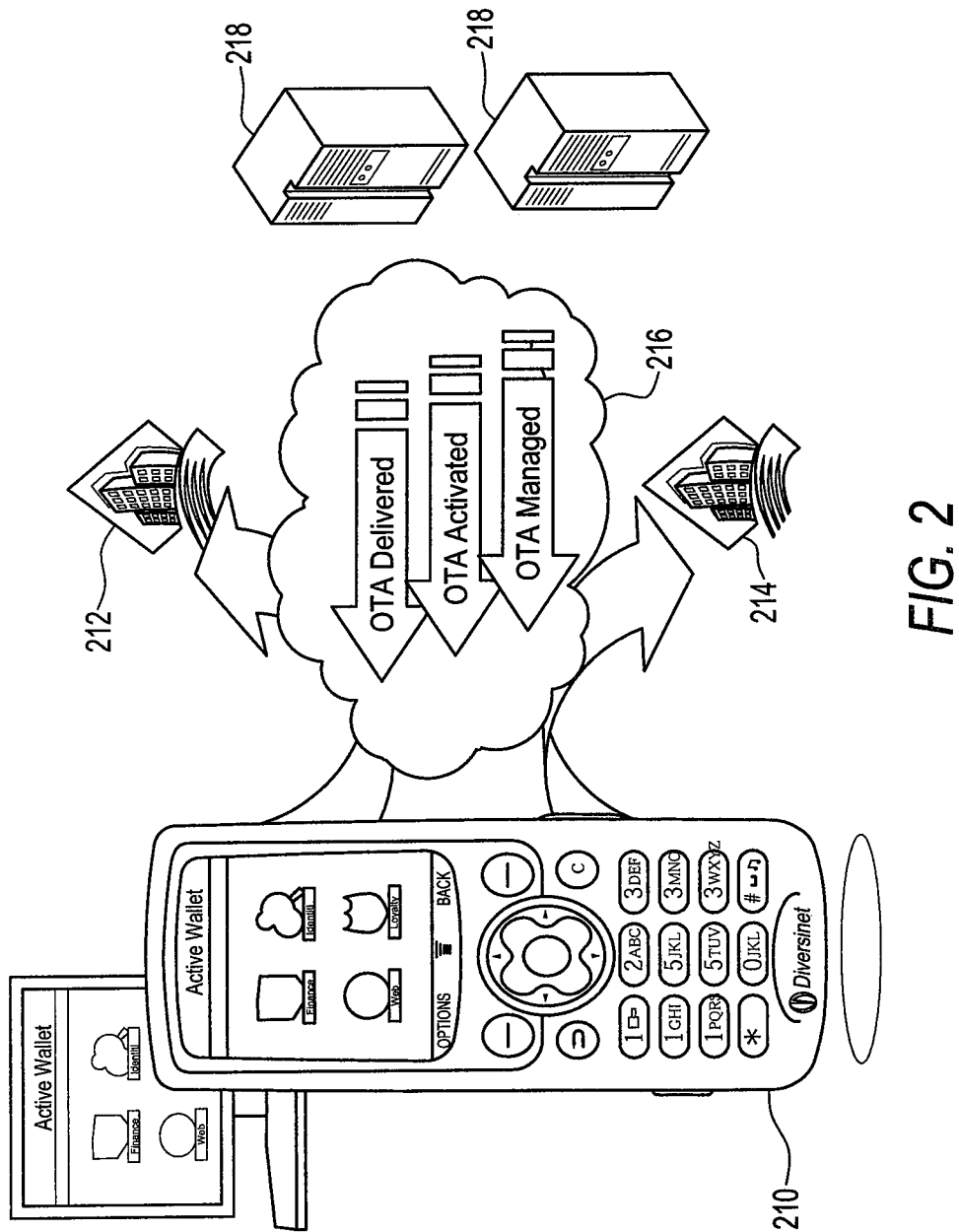
FIG. 2 is a diagram outlining a first element ("wallet") of a mobile phone based personal and identity information system.

The OTP system is applied to the first element in a similar fashion as shown in FIG. 2. From their phone 210, the user accesses a secure site 212, 214 through a secure OTP system 216. The OTP token and authentication is provided by a token provider 218. Information stored on the phone 210 can then be passed securely to the sites 212, 214 as required for the purposes of the user's transaction.

For example, if a user wishes to conduct an online purchase via their mobile phone, the phone contains in the "wallet" the user's banking information (bank account or credit card) and all the user's related commercial information (memberships, loyalty rewards programs, coupons, etc.) for ready access. Once the transaction is authenticated as shown in FIG. 2, the required personal and identity information is retrieved and used in the transaction. Furthermore, if the purchase is an event pass (one-time or multi-use) for a concert, sporting event, play, conference, etc., it may be copied directly into the "wallet" upon completion of the transaction, making it available to the user without delay.

A preferred method of generating and copying the event pass is to use a combined digital certificate and permit system, where a certificate is used to confirm the identity of the permit issuer of a digitally signed and issued permit, with the event pass preferably provided as a permit with an HTML stamp, such as that disclosed in U.S. Pat. No. 6,216,116, which is incorporated herein by reference. If the event pass is generated as an HTML permit stored in the "wallet", then the certificate used for validation of the permit issuer is also contained in the "wallet". Thus, the user not only is able to use the event pass without delay, but also does not require any additional hardware or software to receive the pass, as it is generated and stored on the mobile phone automatically. For example, for digital concert tickets, the permit issuer would be the ticket supplier (i.e. TicketMaster) and the certificate issued by a security company (i.e. VeriSign).

In another example, the "wallet" contains the RFID codes needed for access to a secure building. The user can then call up their code and use their phone as a replacement for a RFID tag or card and gain access to the building.

Figure 3:
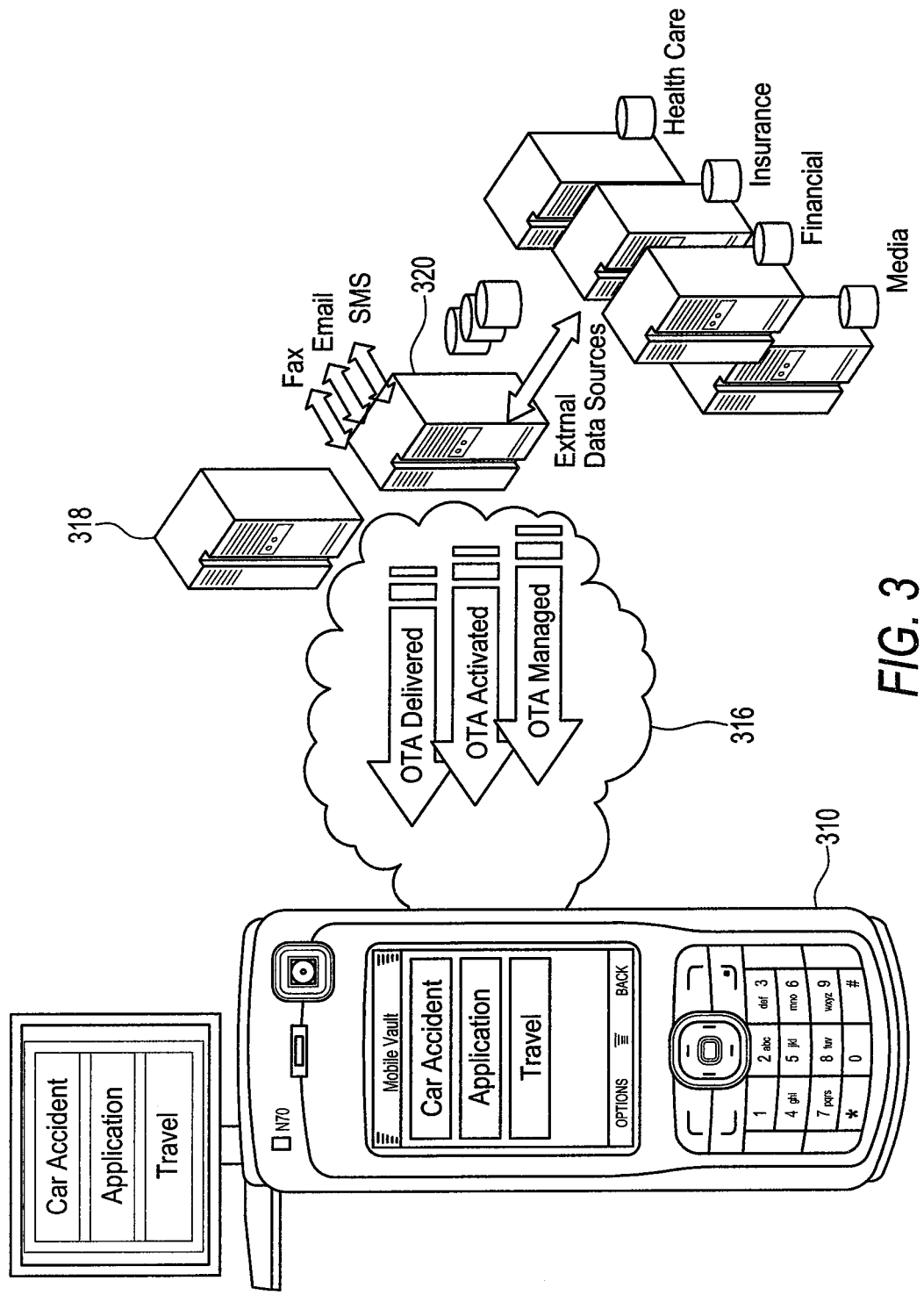
FIG. 3 is a diagram outlining a second element ("vault") of a mobile phone based personal and identity information system.
Figure 4:
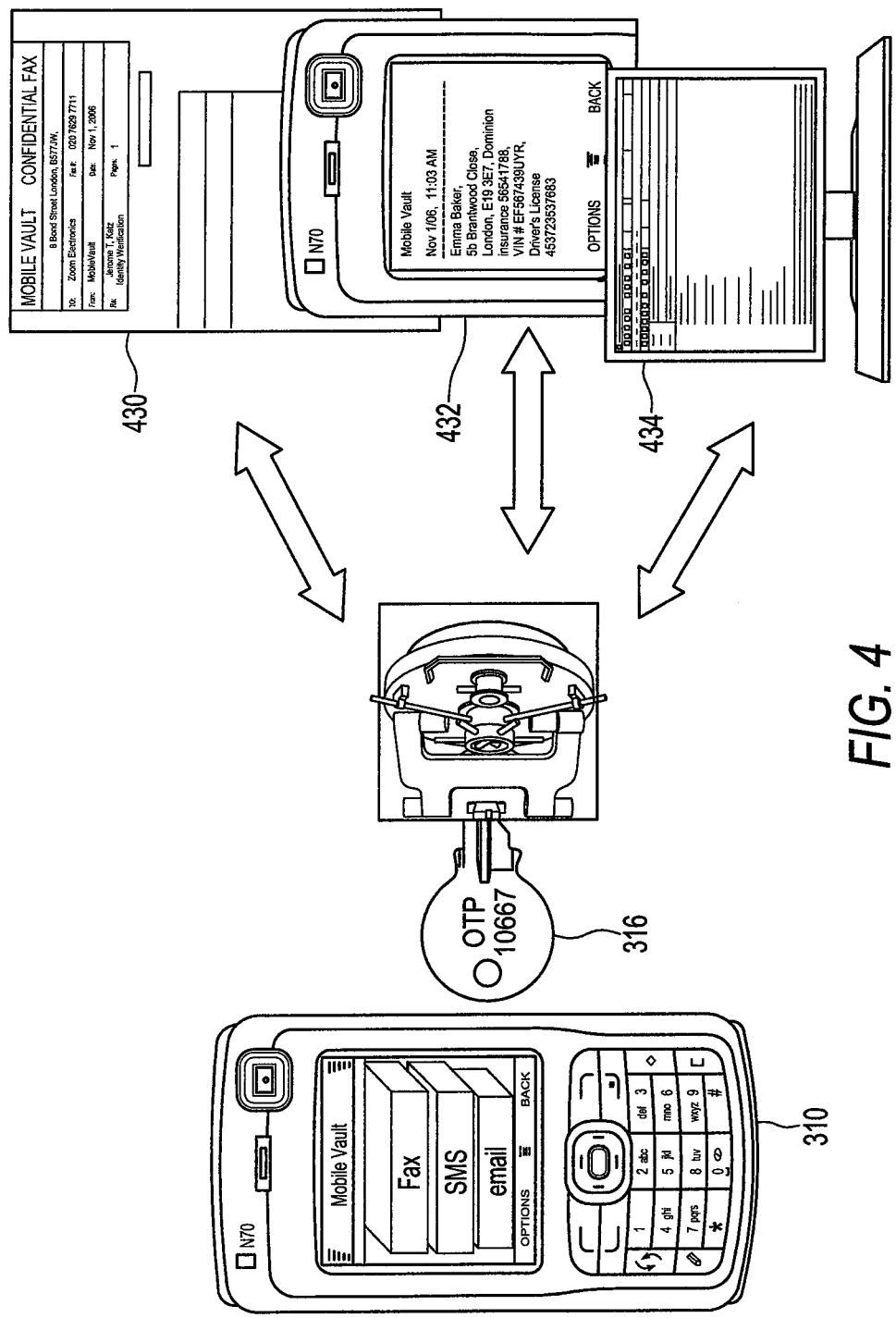
FIG. 4 is a diagram outlining a representation of FIG. 3 for transmission of information from the "vault".

The second element is also accessed via OTP as shown in FIG. 3. The user selects the desired information on their phone 310, and is authenticated by an OTP token 316 from a token provider 318. The information is then retrieved from the second element 320 for transmission to the user. As further shown in FIG. 4, the user then selects on their phone 310 a format for receiving the data. Facsimile 430, SMS 432 and email 434 transmission methods are shown.

Preferably, there is also provided a synchronization system to automatically synchronize information between the first element and the second element. This ensures that the user is provided with up-to-date information.

Generally, the user will only access the second element from the mobile (or other) device which contains the first element. However, in case where the user needs access to the second element from a different device, a method of authorizing a new device is required. One such method is disclosed in U.S. Pat. No. 7,249,371, which is incorporated herein by reference. This method provides a user with the ability to generate a temporary authorization for a new device from an existing, authorized device. Thus, the user can provide access on a different device without negating access from their current device. This same method can also be used to change the authorized device, for example, if the user replaces or upgrades their mobile phone.

This method of authorization can also be used to create a "one-time" or a temporary authorization for use by other parties to access the data contained in the second element. For example, a person traveling could use their mobile device temporarily authorize a doctor to access their medical records via another mobile device or a dedicated desktop system. Authorization is provided in a similar manner to authorizing a new device however, with the addition of an expiration date, either after a single use (access), or after a fixed time (e.g. 24 hours).

While the above method has been presented in the context of mobile devices, particularly mobile phones, the method is equally applicable to any type of personal computing device, such as a PDA, tablet/laptop PC, or desktop PC.

This concludes the description of a presently preferred embodiment of the invention. The foregoing description has been presented for the purpose of illustration and is not intended to be exhaustive or to limit the invention to the precise form disclosed. Many modifications and variations are possible in light of the above teaching and will be apparent to those skilled in the art. It is intended the scope of the invention be limited not by this description but by the claims that follow.

What is claimed is:

1. A system for securely storing and transferring sensitive and confidential data, comprising:
    a secure server for storing:
        personal and identity information of a user; and
        data files corresponding to said personal and identity information of said user;
    a secure communications system to provide said user remote access to said sensitive and confidential data; and a secure transmission system to transmit to said user data files corresponding to said personal and identity information of said user, upon request by said user.

2. The system of claim 1, wherein said secure transmission system transmits via one or more of: facsimile, SMS, email, broadband wireless, and short-range wireless.

3. The system of claim 1, wherein said secure communications system is based on one or more of: one-time password (OTP) tokens, Public Key Infrastructure (PKI), digital certificates, event-based dual OTP encryption and biometrics.

4. The system of claim 1, wherein said secure communications system enables said user remote access via a mobile device.

5. The system of claim 4, wherein said secure communications system enables said user to authorize access to a device controlled by a third party from said mobile device.

6. The system of claim 1, wherein said secure communications system enables offline user remote access via a user-controlled device.

7. A method for securely transferring and storing sensitive and confidential data on a mobile device, comprising:
storing on a server, in a first secure store, personal and identity information of a mobile device user, and, in a second secure store, sensitive and confidential data files corresponding to said personal and identity information of said mobile device user;
interfacing with said mobile device via a secure interface to provide access to said sensitive and confidential data files;
receiving a request from said mobile device user for said sensitive and confidential data files from said second secure store;
authenticating said mobile device user requesting said sensitive and confidential data files; and
presenting said sensitive and confidential data files to said mobile device user thereof.

8. The method of claim 7, wherein said mobile device further comprises a contextual interface for accessing said sensitive and confidential data files in said second store of said server.

9. The method of claim 7, further comprising synchronizing said sensitive and confidential data between said first secure store and said second secure store.

10. The method of claim 9, wherein said mobile device synchronizes a subset of said sensitive and confidential data stored in said first secure store with said sensitive and confidential data files stored in said second secure store of said server.

11. The method of claim 10, wherein said mobile device synchronizes said subset of said sensitive and confidential data stored in said first secure store with said sensitive and confidential data file stored in said second secure store of said server in response to a triggering event.

12. The method of claim 11 wherein said triggering event is a search performed by a user of said mobile device and said subset relates to said search.

13. The method of claim 7, wherein said sensitive and confidential data in said first secure store includes a driver's license and said sensitive and confidential data file in said second secure store includes a vehicle insurance certificate.

14. The method of claim 7, wherein said sensitive and confidential data in said first secure store includes a health card and said sensitive and confidential data file in said second secure store includes user medical records.

15. The method of claim 7, wherein said sensitive and confidential data in said first secure store includes a bank card and said sensitive and confidential data file in said second secure store includes investment records.

16. The method of claim 7, wherein said sensitive and confidential data includes at least one of personal memberships, rewards programs and loyalty programs.

17. The method of claim 7, wherein said sensitive and confidential data includes access information for secure buildings, including one or more of: photo ID, RFID, and biometric ID.

18. The method of claim 7, wherein said sensitive and confidential data include tickets for access to events and venues.

19. The method of claim 7, wherein said sensitive and confidential data includes digitally signed permissions for access to secure environments.

20. The method of claim 7, wherein said mobile device authenticates with said server using a one-time password.

* * * * *